United States Patent [19]

Job

[11] Patent Number: 5,229,342
[45] Date of Patent: * Jul. 20, 1993

[54] OLEFIN POLYMERIZATION CATALYST

[75] Inventor: Robert C. Job, Houston, Tex.

[73] Assignee: Shell Oil Company, Houston, Tex.

[*] Notice: The portion of the term of this patent subsequent to Aug. 25, 2009 has been disclaimed.

[21] Appl. No.: 913,233

[22] Filed: Jun. 24, 1992

Related U.S. Application Data

[62] Division of Ser. No. 599,538, Oct. 18, 1990, Pat. No. 5,151,399.

[51] Int. Cl.$^5$ .............................. C08F 4/649
[52] U.S. Cl. .................... 502/127; 502/111; 502/121; 502/123; 502/124; 502/125; 502/126; 526/132
[58] Field of Search ............... 502/127, 125, 111, 121, 502/123, 124, 126

[56] References Cited

U.S. PATENT DOCUMENTS

| | | |
|---|---|---|
| 4,330,649 | 5/1982 | Kioka et al. |
| 4,472,521 | 9/1984 | Band. |
| 4,525,558 | 6/1985 | Takitani et al. |
| 4,540,679 | 9/1985 | Arzoumanidis. |
| 4,710,482 | 12/1987 | Job .................. 502/127 |
| 4,728,705 | 3/1988 | Nestlerode et al. |
| 4,814,312 | 3/1989 | Murata et al. ............ 502/111 |
| 5,034,361 | 7/1991 | Job et al. ............ 502/125 X |
| 5,141,910 | 8/1992 | Job .................. 502/127 |

Primary Examiner—Patrick P. Garvin
Attorney, Agent, or Firm—Otto O. Meyers, III

[57] ABSTRACT

A complex alkoxide compound containing magnesium, titanium and boron species comprises the reaction product of elemental magnesium, titanium tetraalkoxide, an alkyl borate ester and alkanol at elevated temperature in an inert diluent. This complex alkoxide compound is contacted with a tetravalent titanium halide, a halohydrocarbon and an electron donor to form an olefin polymerization procatalyst. Contact of the procatalyst with an organoaluminum cocatalyst and a selectivity control agent produces a high activity catalyst for the polymerization of lower α-olefins to polymer product of good properties in good catalyst productivity.

9 Claims, No Drawings

OLEFIN POLYMERIZATION CATALYST

This is a division of application Ser. No. 07/599,538, filed Oct. 18, 1990 and now U.S. Pat. No. 5,151,399.

FILED OF THE INVENTION

This invention relates to high activity olefin polymerization catalysts and to a method for the production thereof. More particularly, the invention relates to a magnesium-containing, titanium-containing precursor of an olefin polymerization catalyst component and to the component and to the catalyst produced therefrom.

BACKGROUND OF THE INVENTION

The production of polymers or copolymers of lower α-olefins, particularly ethylene and propylene, has gained substantial commercial acceptance. The polymeric products are inexpensive and exhibit a number of commercially useful properties. In the case of the polymerization of ethylene, the process is relatively uncomplicated in that the product type is not influenced by the manner in which the ethylene molecules add to the growing polymeric chain and the polymeric product does not exist in stereoisomeric forms.

In the case of the polymerization of propylene, however, the presence of pendant methyl groups on the polymeric chain provides the possibility of several types of product depending upon the steric regularity with which the propylene units add to the growing chain. Much, if not most, of the commercial polypropylene is crystalline and results from the stereoregular addition of propylene units in a regular head-to-tail manner. The polypropylene in which the addition of units is random is termed atactic. This amorphous form is less desirable and, if present in significant quantities, must be removed as by extraction in order to obtain a more desirable crystalline product.

Also significant from a commercial standpoint is the activity of the polymerization catalyst. A number of the early polymerization catalysts, e.g., trivalent titanium, chromium or vanadium catalysts, were of relatively low activity and the polyolefin product contained a significant proportion of catalyst residues. The removal of such residues as by a deashing step was required in order to obtain commercially acceptable properties. The more recent olefin polymerization catalysts are more stereoregulating and of sufficient catalytic activity so that extraction and/or deashing steps are not required.

In the terms now conventionally employed for the components, the high activity olefin polymerization catalysts are formed from a procatalyst which typically contains magnesium, titanium and halide moieties as well as an electron donor, a cocatalyst which is usually an organoaluminum compound and a selectively control agent which may be provided as a partial or total complex with the cocatalyst. Although each of the components has a considerable influence on the polymerization catalyst and process and the product thereby produced, the nature of the catalyst as well as the polymerization product seem to be most influenced by the procatalyst. Much of the research directed toward improvement of the olefin polymerization process has been directed toward improvement of the procatalyst component.

Kioka et al, U.S. Pat. No. 4,330,649, describe a solid catalyst component (procatalyst) obtained by heating a soluble magnesium compound such as magnesium chloride with a higher alcohol in the presence of an ester to produce a solution which is added to titanium tetrachloride and an electron donor to form the procatalyst. Band, U.S. Pat. No. 4,472,521, reacts a magnesium alkoxide with a titanium alkoxide of 4 or more carbon atoms in each alkoxide moiety in the presence of aromatic hydrocarbon. Titanium tetrachloride and an electron donor are added to the resulting solution to form a procatalyst which is post-treated with transition metal halide. Arzoumanides, U.S. Pat. No. 4,540,679, produces a catalyst component by contacting a suspension of magnesium ethoxide in ethanol with carbon dioxide. The addition of an organoaluminum compound in a hydrocarbon solvent to the resulting solution produces granular particles which are employed as a support for titanium moieties upon treatment with titanium tetrachloride. Nestlerode et al, U.S. Pat. No. 4,728,705, solubilize magnesium ethoxide in ethanol with carbon dioxide and spray dry the resulting solution or alternatively use the solution to impregnate catalyst support particles. The particles resulting from either modification are useful in the production of a procatalyst of desirable morphology.

A somewhat different type of catalyst component precursor is described by Job, U.S. Pat. No. 4,710,482, wherein a magnesium compound of the general formula $$Mg_4(OR)_6(ROH)_{10}A \qquad (I)$$

is formed wherein R independently is lower alkyl of up to 4 carbon atoms inclusive and A is one or more anions having a total oxidation state of −2. This complex magnesium compound is contacted with a tetravalent titanium halide, a halohydrocarbon and an electron donor to form an olefin polymerization procatalyst. The use of such magnesium compounds has certain advantages in that they are crystals of desirable morphology whereas magnesium ethoxide is not. The conversion of the crystals of such magnesium compounds to olefin polymerization procatalysts is by conventional technology. The catalysts produced from such procatalysts are good high activity polymerization catalysts, particularly for the polymerization or copolymerization of propylene. It would be of advantage, however, to provide improved olefin polymerization catalysts.

SUMMARY OF THE INVENTION

The present invention provides complex magnesium-containing, titanium-containing, boron-containing alkoxide compounds which are useful as precursors of a component of a high activity olefin polymerization catalyst. More particularly, the invention provides such complex alkoxide compounds, as well as the catalyst components and the catalysts produced therefrom. The invention also relates to a process for polymerizing olefins in the presence of such catalysts to produce polyolefin product of good properties in improved yield.

Description of the Invention

The present invention contemplates the formation of a complex magnesium-containing, titanium-containing alkoxide compound which is useful in the production of the procatalyst component of a high activity olefin polymerization catalyst. Such complex alkoxide compounds are produced by contacting elemental magnesium, a titanium alkoxide, a trialkylborate and an alkanol at elevated temperature in the presence of an inert diluent. Solutions of the complex alkoxide compound are contacted with a tetravalent titanium halide, an optional halohydrocarbon and an electron donor to form a solid olefin polymerization procatalyst. The procatalyst is in turn contacted with an organoaluminum cocatalyst and a selectivity control agent to form the high activity olefin polymerization catalyst.

The complex alkoxide compounds of the invention are produced from reaction of magnesium with a titanium tetraalkoxide in which the alkoxide moieties independently have up to 4 carbon atoms inclusive, a trialkylborate in which the alkyl moieties independently have up to 4 carbon atoms inclusive and an alkanol of up to 4 carbon atoms inclusive. The alkyl moieties within each reactant are the same or are different and the alkyl moieties of any one reactant are the same as or different from the alkyl moieties of the other reactants. Although alkyl moieties such as methyl, ethyl, n-propyl and i-butyl are useful the preferred alkyl groups are ethyl and thus the preferred alkoxide groups are ethoxy. In part for reasons of complex alkoxide compound purity and ease of handling, it is preferred that all alkyl (and thus alkoxide groups) be ethyl (ethoxy). The complex alkoxide compounds are produced by contacting the reactants in an inert reaction diluent. The diluent is suitably hydrocarbon such as isopentane, isooctane, cyclohexane, toluene or even a kerosene fraction or a halohydrocarbon such as methylene chloride or chlorobenzene. Isooctane is a preferred hydrocarbon reaction diluent and chlorobenzene is a preferred halohydrocarbon reaction diluent.

The structure of the complex alkoxide compound is somewhat variable and will be determined in part by the ratio of reactants which is employed. The structure of the complex alkoxide compound is complex, but is illustrated by the formula $$Mg_3Ti(OR)_m[B(OR)_4]_n \quad (II)$$

wherein n is equal to or greater than zero but equal to or less than 2, m is equal to (10-n) and R is alkyl of up to 4 carbon atoms. The structure of a preferred embodiment is that of the above formula II in which n is 2. The contact of the precursors of the complex alkoxide compound takes place at an elevated temperature and a pressure sufficient to maintain the reaction mixture in a non-gaseous state. Suitable temperatures for such contacting are from about 40° C. to about 100° C., preferably from about 50° C. to about 80° C. The contacting is conducted in a suitable reactor and is facilitated by conventional techniques such as stirring, shaking or refluxing. The stoichiometry of the reaction is not simple but sufficient magnesium is employed to provide from about 1% by weight to about 6% by weight of magnesium based on total solution weight. Best process results are obtained if a small amount of metal surface activator such as ferric chloride is also provided to initiate reaction. The formation of the complex alkoxide compound is illustrated by the following partial equation which employs the preferred ethoxide moieties.

$$3.1\ Mg\ +\ Ti(OEt)_4\ +\ 0.5\ B(OEt)_3\ +\ 6.5\ EtOH\ \xrightarrow[FeCl_3,\ diluent]{heat}$$

The complex alkoxide compound product mixture which results in a solution whose viscosity varies from "runny" to viscous depending on the particular diluent employed and the quantity thereof as well as the ratio of starting materials employed.

The magnesium-containing, titanium-containing, complex alkoxide compound is the precursor of a solid olefin polymerization procatalyst obtained by contacting the complex alkoxide compound with a tetravalent titanium halide, an optional halohydrocarbon and an electron donor. The tetravalent titanium halide is suitably an aryloxy- or alkoxy- di- or tri-halide such as diethoxytitanium dichloride, dihexyloxytitanium dibromide, isopropoxytitanium trichloride or phenoxytitanium trichloride, or the tetravalent titanium halide is a titanium tetrahalide such as titanium tetrachloride or titanium tetrabromide. A titanium tetrahalide is preferred as the tetravalent titanium halide and particularly preferred is titanium tetrachloride.

The optional halohydrocarbon employed in the production of the olefin polymerization procatalyst is an inert halohydrocarbon of up to 12 carbon atoms inclusive. Exemplary aliphatic halohydrocarbons include methylene chloride, methylene bromide, chloroform, carbon tetrachloride, 1,2-dibromomethane, 1,1,3-trichloropropane, 1,1,2-trichloroethane, trichlorocyclohexane, dichlorofluoromethane and tetrachlorooctane. Aromatic halohydrocarbons suitably employed include chlorobenzene, bromobenzene, dichlorobenzene and chlorotoluene. Of the aliphatic halohydrocarbons, carbon tetrachloride and 1,1,2-trichloroethane are preferred but particularly preferred is the aromatic halohydrocarbon chlorobenzene.

The electron donors which are suitably employed in procatalyst production are the generally conventional electron donors free from active hydrogens which are employed in procatalysts based on titanium including ethers, esters, amines, imines, amides, nitriles, phosphines, stibines, and arsines. The preferred electron donors are esters, particularly alkyl esters of aromatic monocarboxylic and dicarboxylic acids. Examples of such electron donors are methyl benzoate, ethyl benzoate, ethyl p-ethoxybenzoate, ethyl p-methylbenzoate, diethyl phthalate, dimethyl naphthalenedicarboxylate, diisobutyl phthalate and diisopropylterephthalate. The electron donor is a single compound or is a mixture of two or more compounds but preferably the electron donor is a single compound. Of the preferred ester electron donors, ethyl benzoate and diisobutyl phthalate are particularly preferred.

The precise manner in which the procatalyst precursors are contacted is material but is not critical and is generally according to known procedures. In one embodiment, the tetravalent titanium halide is added to a mixture of the electron donor and the complex alkoxide compound. Best results are obtained, however, if the electron donor is added to the complex alkoxide compound and the resulting mixture is added to a portion of the tetravalent titanium halide. Other procedures are also suitable but are less preferred. The solid product which results is washed at least once with halohydrocarbon and with tetravalent titanium halide, employed together or separately. It is often useful to include an acid halide, e.g., benzoyl chloride or phthaloyl chloride, in at least one tetravalent titanium halide/halohydrocarbon wash as is known in the art. The solid procatalyst which results is then typically washed with a light hydrocarbon such as isopentane or isooctane to remove soluble titanium compounds.

In the preferred modification, the initial contacting of the electron donor and the complex alkoxide compound is conducted at a temperature from about ambient temperature to about 150° C. Better interaction of these materials is obtained if they are heated after mixing at ambient temperature. Sufficient tetravalent titanium halide is used, in combination with any acid halide provided, to convert at least a substantial proportion of the alkoxide moieties of the complex alkoxide compound to halide moieties. This conversion, conventionally referred to as halogenation, is conducted in one or more steps, each of which is conducted over a period of time ranging from a few minutes to several hours. During each contacting with tetravalent titanium halide it is optional but preferred to have halohydrocarbon also present. Sufficient electron donor is provided so that the molar ratio of electron donor to the magnesium present in the procatalyst precursor is from about 0.01:1 to about 10:1, preferably from about 0.06:1 to about 0.4:1. The final washing with light hydrocarbon and subsequent drying produces a procatalyst that is solid and granular and is storage stable provided that oxygen and active hydrogen compounds are excluded. Alternatively, the procatalyst is used as obtained from the hydrocarbon washing without the need for drying. The procatalyst thus produced is used in the production of an olefin polymerization catalyst by contact with cocatalyst and selectivity control agent.

The cocatalyst component of the olefin polymerization catalyst is an organoaluminum compound selected from the cocatalysts conventionally employed with titanium-based procatalysts. Illustrative organoaluminum cocatalysts are trialkylaluminum compounds, alkylaluminum alkoxide compounds and alkylaluminum halide compounds wherein each alkyl has from 2 to 6 carbon atoms inclusive. The preferred organoaluminum compounds are free of halogen and particularly preferred are trialkylaluminum compounds such as triethylaluminum, triisopropylaluminum, triisobutylaluminum and diethylhexylaluminum. Triethylaluminum is a preferred trialkylaluminum cocatalyst. The organoaluminum cocatalyst, during formation of the olefin polymerization catalyst, is employed in a molar ratio of aluminum to titanium of the procatalyst from about 1:1 to about 150:1, but preferably in a molar ratio of from about 10:1 to about 100:1.

The selectivity control agents which are used in the production of olefin polymerization catalyst are those selectivity control agents conventionally employed in conjunction with titanium-based procatalysts and organoaluminum cocatalysts. Illustrative of suitable selectivity control agents are those classes of electron donors employed in procatalyst production as described above as well as organosilane compounds including alkylalkoxsilanes and arylalkoxysilanes of the formula

$$R'_r Si(OR)_{4-r} \quad (III)$$

wherein R' independently is alkyl or aryl of up to 10 carbon atoms inclusive, R independently is alkyl of up to 4 carbon atoms inclusive and r is 1 to 2. The preferred selectivity control agents are esters of aromatic monocarboxylic and dicarboxylic acids, particularly alkyl such as ethyl p-ethoxybenzoate, diisobutyl phthalate, ethyl benzoate and ethyl p-methylbenzoate, or the preferred selectivity control agents are alkylalkoxysilanes such as ethyldiethoxysilane, diisobutyldimethoxysilane, propyltrimethoxysilane or cyclohexylmethyldimethoxysilane. In one modification the selectivity control agent is the electron donor added with the tetravalent titanium halide-halohydrocarbon washes. In an alternate modification the selectivity control agent is provided at the time of the contacting of procatalyst and cocatalyst. In either embodiment of the production of the olefin polymerization catalyst the selectivity control agent is provided in a quantity of from about 0.01 mole to about 100 moles of titanium of the procatalyst. Preferred quantities of selectivity control agents are from about 0.5 mole to about 20 mole per mole of titanium of the procatalyst.

The olefin polymerization catalyst is produced by known procedures of contacting the procatalyst, the cocatalyst and the selectivity control agent. The method of contacting is not critical. In one modification the catalyst components are simply mixed in a suitable reactor and the preformed catalyst thereby produced is introduced into the polymerization system when initiation of polymerization is desired. In an alternate modification, the catalyst components are introduced into the polymerization reactor where the catalyst is formed in situ.

The olefin polymerization catalyst formed from the complex alkoxide compound by way of the procatalyst is useful in the polymerization under polymerization conditions of lower α-olefins and particularly in the polymerization of straight-chain α-olefins of up to 4 carbon atoms inclusive, i.e., ethylene, propylene and 1-butene or mixtures thereof. The precise procedures and conditions of the polymerizations are broadly conventional but the olefin polymerization process, by virtue of the use therein of the polymerization catalyst formed from the complex alkoxide compound precursor, provides polyolefin product and particularly polypropylene product having a relatively high bulk density in quantities which reflect the relatively high productivity of the olefin polymerization catalyst. The polymerization product is suitably a homopolymer such as polyethylene or polypropylene, particularly polypropylene, when a single α-olefin monomer is supplied to the polymerization process. Alternatively, the catalyst and process of the invention is useful in the production of copolymers including copolymers of ethylene and propylene such as EPR and polypropylene impact copolymer as when two or even more α-olefin monomers are supplied to the polymerization process.

Polymerization is suitably conducted under polymerization conditions in a gas-phase process employing one or more fluidized beds of catalyst or is conducted as a slurry-phase process incorporating as diluent an inert material such as propane or a liquified monomer of the polymerization such as propylene. The molecular weight of the polymer product is typically influenced by the provision of molecular hydrogen to the polymerization system as is known in the art. The polymerization process is conducted in a batchwise manner or in a continuous or semi-continuous manner with constant or intermittent addition of catalyst or catalyst components to the polymerization reactor.

In general, the productivity of an olefin polymerization catalyst exhibits an inverse relationship with selectivity so that many highly active polymerization catalysts have a good productivity but a relatively low stereospecificity. The catalysts of the invention exhibit good productivity while retaining desirably high stereospecificity so that the polymer product obtained by the use of such a catalyst has good properties without the necessity of an extraction or deashing step.

The invention is further illustrated by the following Illustrative Embodiments which should not be regarded as limiting. In the Illustrative Embodiments the productivity of the catalyst termed "Yield", is measured as kg of polymer product/g of procatalyst obtained in a standard batch, slurry-phase polymerization of 1 hour, or alternatively the productivity is expressed in kg of polymer product/g of Ti as determined in a similar fashion. B.D. represents bulk density of the product in gm/cc. The stereospecificity of the catalyst is determined by measuring the amount of xylene soluble polymer (termed XS) at ambient temperature in accordance with the regulations of the U.S. Food and Drug Administration. The test for xylene solubles is conducted by dissolving the polymer in xylene under reflux. The flask containing the dissolved polymer is then immersed in a water bath at 25° C. and maintained without stirring for 1 hour, during which the insoluble portion precipitates. The precipitate is removed by filtration and the solubles content of the filtrate is determined by evaporation of an aliquot followed by drying and weighing of the residue. The xylene solubles consist primarily of amorphous (atactic) polymer and a small amount of low molecular weight crystalline polymer.

ILLUSTRATIVE EMBODIMENT I

Magnesium turnings (2.44 g, 100 mmol), titanium tetraethoxide (8.8 g of 95%, 33 mmol) and triethylborate (4.86 g, 33 mmol) were slurried in 71.3 g of chlorobenzene in an 8-ounce bottle and 3.5 g of 3.5% ferric chloride in ethanol was added. A balloon was attached to the bottle and the mixture was stirred while immersed in a 65° C. oil bath. After 40 minutes the volume of the balloon was about 200 ml. Additional ethanol, 3.7 g, was added and the evolution of hydrogen became more vigorous, providing 200 ml of gas in about 4 minutes. After an additional 30 minutes when gas evolution had subsided, another 2.5 g of ethanol was added. After a total of 4 hours, nearly all the magnesium had dissolved (reacted) to give a pale yellow solution. An additional 0.5 g of the ferric chloride solution was added and the mixture was stirred overnight. At the end of this period, all the magnesium had dissolved. The solution had a magnesium content of 2.2% and a molar B/Mg/Ti ratio of 1/3/1.

ILLUSTRATIVE EMBODIMENT II

To 49 g of the solution produced according to Illustrative Embodiment I were added magnesium turnings (1.32 g, 54 mmol) titanium tetraethoxide (4 g of 95%, 17 mmol) and 5 g of the 3% ferric chloride solution in ethanol. After stirring overnight, while placed in a 65° C. oil bath, a slightly cloudy, pale yellow solution resulted. About 0.1 g of magnesium had not reacted. The solution had a B/Mg/Ti molar ratio of 0.5/3/1.

ILLUSTRATIVE EMBODIMENT III

Magnesium turnings (62.9 g, 2.59 moles), titanium tetraethoxide (200 g of 95%, 0.83 mole), triethylborate (60.7 g, 0.42 mole) and 96 g of 2% ferric chloride in ethanol were mixed with 750 g of isooctane in a 2 liter, 3-neck flask equipped with a reflux condenser. The flask and contents were heated to about 65° C. and a moderate evolution of hydrogen took place. After about 2 hours 95 g of ethanol was added and after an additional two hours 49 g of ethanol was added. After stirring for a total of 36 hours at 60° C. the clear solution which resulted was filtered while warm to remove 2.73 g of unreacted magnesium. The filtrate was 1297 of a clear, olive drab solution having a magnesium content of 4.6% and a molar B/Mg/Ti ratio of 0.5/3.0/1.0.

ILLUSTRATIVE EMBODIMENT IV

Using the solutions of complex alkoxide compounds prepared according to Illustrative Embodiments I-III, olefin polymerization catalysts were produced. To prepare the procatalyst precursors of the catalysts, an amount of a solution of a previous Illustrative Embodiment sufficient to provide from 30 mmol to about 50 mmol of magnesium was mixed into 150 ml of titanium tetrachloride and then digested for about 60 minutes at 110° C. with diisobutyl phthalate at a concentration of about 40 mmol per liter. This was followed by a first 30-minute wash at 110° C. with 150 ml of a 50/50 by volume mixture of chlorobenzene and titanium tetrachloride containing 6 mmol/liter of phthaloyl chloride. A second 30-minute wash at 110° C. with the 50/50 by volume mixture of chlorobenzene and titanium tetrachloride was then conducted. The resulting solid was then washed one time with isooctane at 90° C. and twice with isooctane at room temperature. The product was then dried in nitrogen at 50° C.

In these preparations, several methods of mixing the complex alkoxide compound solutions of Illustrative Embodiments I-III with the diisobutyl phthalate and the mixture containing titanium tetrachloride to provide the above described digestion mixture were employed. These methods are described below.

A. The diisobutyl phthalate was added to the complex alkoxide compound solution and the resulting mixture was added dropwise to 150 ml of the titanium tetrachloride digestion solvent at room temperature. The slurry which resulted was heated to 110° C. after 20 minutes and held at 110° C., with stirring, for one hour.

B. The diisobutyl phthalate was added to 150 ml of the titanium chloride-containing digestion solvent at 110° C. and the solution of the complex alkoxide compound was added dropwise.

C. The solution of the complex alkoxide compound was added to the titanium tetrachloride digestion solvent at 110° C. and the diisobutyl phthalate was added to the resulting mixture.

ILLUSTRATIVE EMBODIMENT V

The olefin polymerization procatalysts of Illustrative Embodiment IV were converted to an olefin polymerization catalyst by contact with a triethylaluminum cocatalyst and diisobutyldimethoxysilane selectivity control agent, except wherein indicated. These catalysts were used to polymerize propylene in a conventional slurry-phase process using liquid propylene as diluent. The results of these polymerizations are shown in the Table along with the results obtained while using a catalyst produced from magnesium ethoxide rather than the complex alkoxide compound of the invention. In the Table, the term "Ratio" identifies the B/Mg/Ti molar ratio and the term "Procedure" indicates the method used to prepare the cocatalyst as well as the solvent employed.

TABLE

| Run | Ratio | Procedure | Ti, % | Yield, Kg PP/g cat | XS, % | B.D. |
|---|---|---|---|---|---|---|
| 1 | Mg(OEt)$_2$ | — | 2.28 | 26.6 | 2.7 | 0.33 |
| 2 | 0.5/3/1 | A, chloroben- | 3.17 | 36.7 | 3.6 | 0.37 |

TABLE-continued

| Run | Ratio | Procedure | Ti, % | Yield, Kg PP/g cat | XS, % | B.D. |
|---|---|---|---|---|---|---|
| 3 | 0.5/3/1 | B, chlorobenzene | 2.55 | 23.5 | 3.4 | 0.373 |
| 4 | 1/3/1 | A, chlorobenzene | 3.04 | 25.8 | 4.3 | — |
| 5 | 0.5/3/1 | A, chlorobenzene | 2.77 | 27.1 | 3.8 | 0.349 |
| 6 | 0.5/3/1 | C, chlorobenzene | 2.74 | 25.5 | 3.6 | 0.393 |
| 7 | 0.5/3/1 | A, isooctane | 3.11 | 32.6 | 3.3 | 0.368 |

When Run 5 was repeated except that the selectivity control agent was tetramethylpiperidine, the yield was 38.6 Kg PP/g cat and the xylene soluble content was 7.3%.

What is claimed is:

1. A solid, olefin polymerization procatalyst produced by contacting
   (A) a complex alkoxide compound containing magnesium, titanium and boron species, which comprises the reaction product of magnesium, a titanium tetraalkoxide, an alkyl borate ester and an alkanol, in inert diluent at elevated temperature from about 40° C. to about 100° C.: with
   (B) a tetravalent titanium halide;
   (C) a halohydrocarbon; and
   (D) an electron donor.

2. The procatalyst of claim 1 wherein the tetravalent titanium halide is titanium tetrahalide.

3. The procatalyst of claim 2 wherein the complex alkoxide compound is of the formula $$Mg_3Ti(OR)_6[B(OR)_4]_2$$

wherein each R is ethyl.

4. The procatalyst of claim 3 wherein the electron donor is alkyl ester of aromatic monocarboxylic or dicarboxylic acid.

5. The procatalyst of claim 4 wherein the titanium tetrahalide is titanium tetrachloride.

6. The procatalyst of claim 5 wherein the electron donor is ethyl benzoate.

7. The procatalyst of claim 4 wherein the electron donor is diisobutyl phthalate.

8. The procatalyst of claim 1, wherein the complex alkoxide compound is of the formula $MgTi(OR)_m[B(OR)_4]_n$ wherein n is greater than zero and less than or equal to 2, m equals 10 minus n, and R is alkyl of up to 4 carbon atoms.

9. The procatalyst of claim 8, wherein the electron donor is alkyl ester of aromatic monocarboxylic or dicarboxylic acid.

* * * * *